April 21, 1970     M. SCHONBERGER     3,507,154
TEMPERATURE MEASURING APPARATUS
Original Filed Feb. 3, 1965
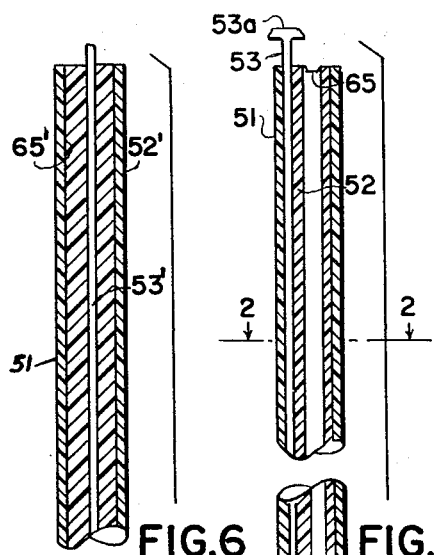
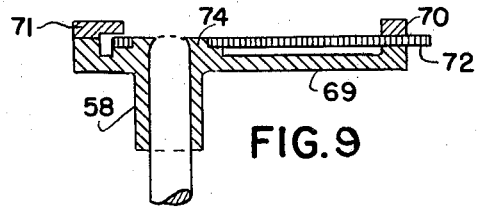
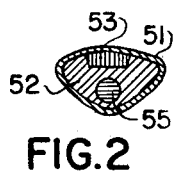
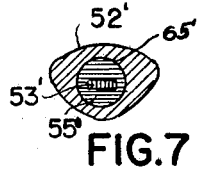
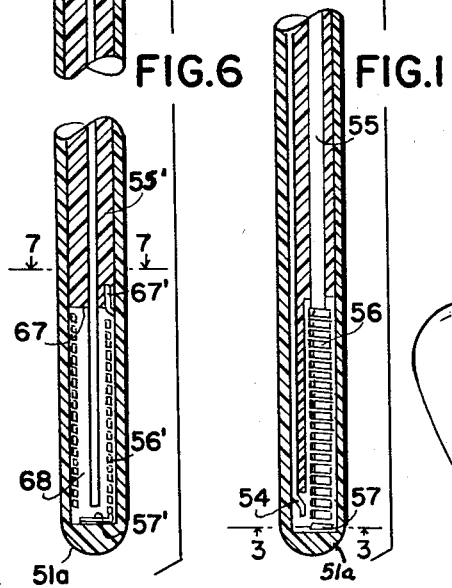
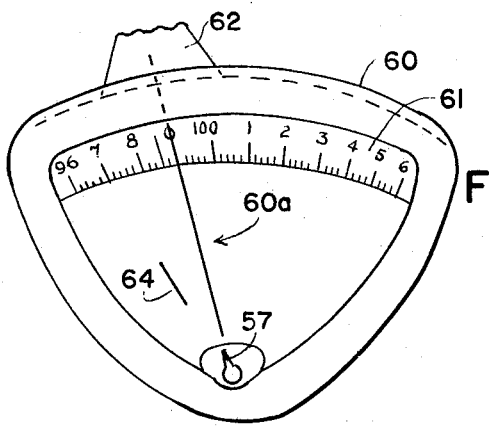
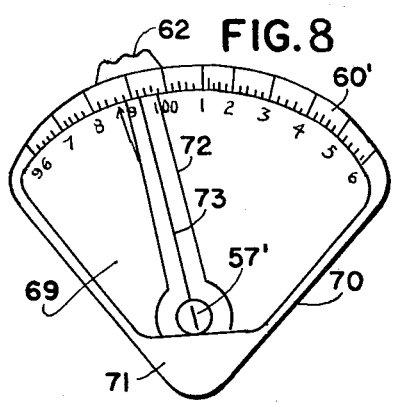
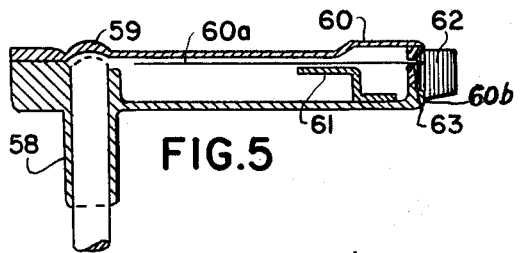
INVENTOR
Milton Schonberger
By Joseph Hirschmann
ATTORNEY United States Patent Office 3,507,154
Patented Apr. 21, 1970

3,507,154
TEMPERATURE MEASURING APPARATUS
Milton Schonberger, Westwood, N.J., assignor to I.N.M.
 Industries Corporation, New York, N.Y., a corporation
 of Delaware
Original application Feb. 3, 1965, Ser. No. 431,771, now
 Patent No. 3,379,063, dated Apr. 23, 1968. Divided and
 this application Apr. 22, 1968, Ser. No. 722,880
Int. Cl. G01k 5/70
U.S. Cl. 73—363.9        10 Claims

ABSTRACT OF THE DISCLOSURE

The invention provides a temperature measuring system in which a non-indicating heat receptor or probe is placed in heat-absorbing relation with a body or region whose temperature is to be measured, the receptor or probe storing heat at the temperature to be measured and responding to the rise in temperature by way of the rotation of a bimetallic coil. The receptor or probe during such time is not connected to a temperature indicating device, but is subsequently brought into temperature indicating relation with such device whereby the maximum degree of rotation of the coil is measured and the corresponding temperature indicated.

---

The present application is a division of my co-pending application, Ser. No. 431,771 filed Feb. 3, 1965, which issued as Patent No. 3,379,063 on Apr. 23, 1968.

The present invention relates to apparatus for measuring temperature, and more particularly to a heat-measuring system which includes a heat collector or receptor in the form of a probe which can be made cheaply enough to be disposable after a single use and which is adapted to be exposed to the heat of the body or region whose temperature is to be measured, and a separate meter for measuring and indicating in terms of degrees of temperature the attained condition of the probe resulting from the absorption of heat.

While the invention is of general applicability in various fields, it is particularly advantageous in the form of a fever thermometer system and will accordingly be described in detail in connection therewith.

The present invention is characterized by the fact that the probe is merely a heat-absorbing element which contains or presents no temperature scale, and is connected to a "read-out" or measuring and indicating instrument only after it has attained the temperature to be measured. What may be termed the heat or temperature storing device is in the form of a metallic member which expands as its temperature rises and deflects a pointer as its temperature rises, the extent of deflection being converted into degrees of temperature after insertion in the measuring and indicating instrument.

According to the present invention, the heat-measuring apparatus accordingly is composed of two separate parts, one part being the heat collector or heat-receptor probe which in use is allowed to reach the temperature of the human body (or any other body or region whose temperature is to be measured), while the other part constitutes the actual measuring and indicating device or meter.

In its preferred form, the present invention employs a bimetallic coil of known form and constitution, the angular displacement or degree of rotation of a free end thereof being measured in a read-out device having a temperature scale and an index member or pointer which is set in correspondence with the degree of angular displacement of the coil and by reference to a fixed norm or zero point so as to indicate on the scale the temperature which the heat receptor has reached. In a preferred form of this embodiment of the invention, means are provided for fixing the free or movable end of the coil in its maximum deflected position, so that the determination of the actual temperature need not be made promptly but can await the convenience of the doctor or nurse or other attendant.

The invention will be further described by reference to the accompanying drawing wherein:

FIG. 1 illustrates a longitudinal section through the heat collector or receptor which includes a coiled metallic element;

FIG. 2 is a transverse section along the line 2—2 of FIG. 1 on an enlarged scale;

FIG. 3 is a section taken along the line 3—3 of FIG. 1, likewise on an enlarged scale;

FIG. 4 shows a face view of the metering or read-out device for translating the angular movement of the metallic coil into degrees of temperature;

FIG. 5 is a section along the pointer of the metering or read-out device and shows the receptor in position therein;

FIG. 6 illustrates a variation of the heat receptor structure of FIG. 1 in central longitudinal section;

FIG. 7 is a transverse section of the receptor along the line 7—7 of FIG. 6;

FIG. 8 is a face view of the modified temperature indicating meter; while

FIG. 9 is a section showing the receptor or probe in position in the metering device of FIG. 8.

Referring to the drawing, the measuring apparatus consists essentially of two parts, namely, the actual temperature measuring or indicating member, herein sometimes termed a "read-out" device, and a heat collector, receptor or probe shown in FIGS. 1 and 6 at 51. The heat receptor, in the form of the invention illustrated in FIG. 1, consists of a probe which not only collects heat until it attains the temperature of the body whose temperature is to be measured, but converts the absorbed heat into mechanical movement of a heat-responsive element whose degree of movement or deflection or the like is subsequently measured in the read-out device which converts the changed condition of the receptor into a temperature reading. In a satisfactorily tested form of this apparatus, there is employed a metallic coil fixed at one end to a plastic holder and free at its other end to rotate or become angularly deflected in response to the rise in temperature. To obtain a high degree of deflection or rotation per unit of temperature, there is preferably employed a bi-metallic coil of various types which are known and available on the market. To facilitate measurement of the degree of rotation of the free end of the coil, its end portion is bent so as to extend through the diameter of the coil, such end portion being rotated angularly in proportion to the intensity of the heat absorbed by the coil. Means may be provided to fix the angular position of the coil end at its maximum deflection, and the receptor or probe then brought at any convenient time to the metering or read-out device for measuring the degree of deflection of the coil end.

Referring to the embodiment illustrated in FIGS. 1 to 5, the heat receptor or probe is shown as comprising an outer casing 51 formed as a tube of glass or transparent plastic, which may be open at its upper end and whose bottom end 51a is closed and of thickened convex shape to act as a magnifying lens for a purpose which will appear hereinafter.

The casing 51 is of non-circular shape, as shown in FIGS. 2 and 3, and receives with a snug fit a sleeve or carrier 52 of similar shape in cross-section. The carrier has a longitudinal bore which receives and holds frictionally in adjusted position a rod 55, the carrier being grooved to receive a plunger 53 which can be depressed when finger pressure is applied to its free end 53a, the plunger being held in depressed condition by friction. The lower end of the plunger is offset, as shown at 54 in FIG. 1. To the end of the rod 55 there is permanently fixed one end of a bimetallic, temperature-responsive coil 56 whose free end is shaped in the form of a pointer 57 which preferably passes through the axis of the coil.

The receptor unit can be assembled as follows:

One end of the bimetallic coil 56 having been fixed to the rod 55, the latter is then inserted into the longitudinal bore in carrier 52. The plunger 53 is then slid into place within the groove provided in the carrier. The whole assembly is now inserted into the outer casing 51. The rod 55 is equipped at its outer end with a slot 65, so that the unit, after assembly, may be calibrated for any variation in thickness or in other physical properties of the bimetallic coil in the manner described below. FIG. 3 presents a view of the pointer as seen through the magnifier 51a in a deflected position.

The receptor 51 is adapted to be read with the aid of a meter or read-out device 60 (FIGS. 4 and 5) which is provided with a temperature scale 61 over which moves a pointer 60a controlled by a slide 62 to which it is attached. The slide fits within a depressed portion of the upper end of the frame 60b as shown in FIG. 5, the pointer passing through a slot in such depressed portion. The meter is provided with a tubular member 58 of the same cross-section as receptor 51 and within which the receptor fits snugly with its pointer 57 visible through a window 59 which is preferably convex to provide additional magnification.

The receptor is calibrated in terms of the scale 61 by inserting the receptor in an environment of a predetermined temperature, for instance, 100° F. and then adjusting the rod 55 by means of a screw driver or other tool which is engaged in the slot 65, so that the pointer 57 is caused to "point" toward the 100° F. mark on the scale. The scale itself is calibrated according to the average heat expansion characteristic of the coil.

The mode of operation of the temperature measuring apparatus shown in FIGS. 1 to 5 is as follows: The lower end portion of the receptor or probe is inserted into a body orifice and after one or more minutes, when the coil 56 has attained the maximum expansion, the plunger 53 is depressed so that the pointer 57 is firmly clamped between the bottom wall of the casing 51 and the lower end of the offset portion 54 of the plunger. The bimetallic coil is of such light construction that it can not overcome the pressure of the plunger despite the fact that the latter is held in depressed condition only by friction. The receptor is then removed and inserted into the tubular member 58 of the read-out device 60. As the probe has been calibrated by adjustment of the rod 55 and hence also of the bimetallic coil with reference to the scale 61, the angular position of pointer 57 will give a correct indication of the temperature on the scale 61. It is then necessary only to "sight" the pointer 57 position with reference to the scale 61. This is accomplished by adjusting the slide 62 to which the pointer 60a is fixed and which rides over the scale 61 until the pointers 60a and 57 are directly in line with each other. The temperature is then read off the scale 61.

The pointer 60a is positioned at a right angle to the arc of the scale and of the slide 62. Should the 90° mounting of the pointer 60a be disturbed, as by dropping of the meter or by some other mishap, means is provided for quickly checking its accuracy. This is shown in the form of a radial mark 64 on the face of the scale. As illustrated, the mark 64 registers with the numeral 7 (97°) on the scale. If the pointer 60a should fail to be in line with the scale number 7 and with mark 64, then the user will be aware that the read-out device should be re-adjusted.

The receptor of FIG. 1 can be disposable, i.e., it can be made cheaply enough so that it can be discarded after each use; or it can be employed repeatedly with the same patient, as in a hospital, and then discarded when the patient is discharged. However, as the metallic coil and also the plastic parts of the receptor can withstand sterilizing temperatures, it will be evident that the receptor can be sterilized for re-use in a manner that is impossible for mercury and other liquid-type thermometers.

In the form of the invention shown in FIGS. 6 to 9, in which parts corresponding to those of FIGS. 1 to 5 are identified by similar reference characters, the tubular member 51 of FIGS. 1 and 2 is eliminated. The glass or plastic stem or sleeve 52' is of non-circular cross-section, and constitutes the outer member. The stem 52' is provided with a circular, symmetrically disposed longitudinal bore 65', within which is disposed a frictionally held circular rod 55' of plastic material, such rod terminating at some distance from the bottom of the stem, as indicated at 67, so that a hollow space 68 is provided between the bottom of the rod and the bottom of the stem, such space being closed by a transparent plano-convex mass 51a similar to that shown in FIG. 1.

Within the space 68 there is disposed the heat-expansible metallic coil 56' of known constitution similar to but of larger diameter than the coil 56 of FIG. 1. The upper end of the coil is fixed to the bottom end portion of the rod 55, as indicated at 67', while its lower end is free. The free end portion of the coil is bent so as to pass through the longitudinal axis of the coil, for a purpose which has already been explained in connection with FIG. 1. The bent portion is indicated at 57'.

Passing centrally through an axial bore in the rod 55 is a bar or plunger 53' whose bottom end is in close proximity to the diametral extension 57' of the coil, as shown in FIG. 6. The plunger 53' is so disposed that, in all the angular positions of the extension 57', it overlies the latter, so that upon depression of the plunger, it will clamp the portion 57' of the coil against the bottom of the stem. The plunger 53' is not provided on its top end with a gripping means, such as the flat horizontal portion shown at 53a in FIG. 1, which enables the plunger 53 to be withdrawn after a coil deflection has been measured, and the receptor then re-used; on the contrary, the plunger 53' of FIG. 6 has no enlarged portion at its upper end, so that once it is depressed, its top end being then flush with the top of stem 52', it can not be withdrawn, and the receptor can not be re-used, i.e., it must be discarded.

The mode of converting the deflection of the pointer 57' of FIG. 6 into a visible temperature reading is similar to that described in connection with FIGS. 1 and 4. When the probe 52' has attained the temperature to be measured, it is inserted into a similarly non-circular tubular sleeve extending rearwardly of the face 69 of meter 71 in such manner that the pointer 57' is visible through the inner end of the sleeve, which end may either be open or be provided with a magnifying transparent convex lens. The deflection of the pointer is then reproduced on the face of the measuring instrument by means of the manually adjustable slide 62 which moves in a groove or track in frame 70 similar to track 63 of FIG. 5. The slide rotates about the center of the arc of the scale 60' and has connected thereto an arm 72 having a radially extending index line 73. This line is brought into registry with the pointer 57 and the temperature then read off on the scale 60'.

It will be apparent from the foregoing that my invention can readily be adapted for the measurement of temperatures in other ranges than are encountered in the case of patients with fever. Thus, the heat collector can be employed in situations wherein it would be inconvenient or too expensive to employ the usual thermometers, as where temperature readings of a large number of solutions must be taken, or where the temperature range is beyond that which can be measured directly with an alcohol or mercury thermometer. At very high temperature ranges (i.e., above the melting or decomposition temperature of plastic materials) the collector can be made of ceramic or other high heat-resisting material.

If desired, the plunger 53 or 53' can be eliminated and the space within the tubular end of the receptor stem can be filled with a liquid or semi-solid material of high heat capacity, such as petrolatum, which would insure that the deflection of the coil would not visibly change during the short time required to bring the receptor to the meter and to sight the deflection on the scale.

I claim:

1. A heat-receptor probe adapted to be placed in heat-receiving relation to a region whose temperature is to be measured and to collect heat to substantially the temperature of such region, said probe being devoid of temperature indicating indicia and being devoid also of means for connection to a separate and remote measuring device while gathering heat in said region, said probe comprising a hollow member having a closed end, a heat-expansible coil within the hollow member adjacent to the closed end thereof, means on said coil and responsive to the expansion of said coil for indicating visually the degree of deflection of the coil, said means being adjacent to the said closed end of the hollow member, said means serving for cooperation with a separate measuring device for visual readout of the attained temperature on a temperature scale forming part of such device.

2. A probe according to claim 1, wherein the probe is in the form of a tube and wherein the coil is a bimetallic coil fixed at one end and free to rotate at its other end adjacent to the closed end of the hollow member in proportion to the degree of heat absorbed by the probe, the free end of the coil terminating in an index member intersecting the longitudinal axis of the coil.

3. A heat-receptor probe according to claim 2, in the form of a disposable hospital thermometric probe useful in determining a patient's temperature, comprised of a non-toxic plastic tubular member housing the bimetallic coil; the dimensions and thermal properties of the components being such that the probe can be comfortably placed in a patient's body cavity similarly to a conventional thermometer and such that the coil will reach adjacent body temperature in a conveniently short time and yet upon removal of the probe from the body will maintain such temperature and permit of measurement thereof by way of the amplitude of the deflection of the coil to thereby determine the patient's temperature.

4. A probe according to claim 2, wherein the end of the tube at the said index member is closed and thickened to provide a convex lens for magnifying the said member and its displacement.

5. A probe according to claim 1, including means for fixing the said deflection indicating means in its position of maximum deflection.

6. The combination with the probe of claim 1, of a read-out instrument having a tubular member for receiving the probe in a manner to expose the bottom end of the probe at the face of the instrument, and a pointer playing on a temperature scale and movable into registry with the deflection-indicating means of the coil of the probe.

7. The combination according to claim 6, wherein the probe and tubular member are non-circular in cross-section for orienting the probe with respect to the temperature scale.

8. A probe according to claim 1, wherein the said deflection indicating means comprises an index member extending from the free end of the coil and wherein the bottom of the hollow member of the probe is in the form of a transparent convex lens acting to magnify the index member and its degree of deflection.

9. A probe according to claim 1, said probe being non-circular in cross-section, whereby the probe may be oriented in a measuring and indicating instrument provided with a similarly shaped opening wherein the probe is received.

10. A probe according to claim 1, including means for fixing the said deflection indicating means in its position of maximum deflection, said fixing means comprising a plunger movable to clamp the indicating means in its deflected position.

References Cited

UNITED STATES PATENTS

| 1,933,801 | 11/1933 | Hart | 73—363.9 |
| 2,743,612 | 5/1956 | Kebbon et al. | 73—363.9 XR |
| 3,161,057 | 12/1964 | DuBois | 73—363.9 |

LOUIS R. PRINCE, Primary Examiner

W. A. HENRY II, Assistant Examiner